United States Patent [19]
Macri

[11] Patent Number: 6,102,374
[45] Date of Patent: Aug. 15, 2000

[54] EDGING BLOCK SYSTEM

[76] Inventor: Charlie Macri, 9 Harrison Ave., Westerly, R.I. 02891

[21] Appl. No.: 09/052,372

[22] Filed: Mar. 31, 1998

[51] Int. Cl.⁷ ........................................... A01G 1/08
[52] U.S. Cl. .................. 256/24; 256/19; 47/33; 404/6; 52/102
[58] Field of Search ................. 256/24, 25, 19, 256/1; 47/33; 404/6, 7; 52/102

[56] References Cited

U.S. PATENT DOCUMENTS

| | | | |
|---|---|---|---|
| 3,732,653 | 5/1973 | Pickett | 256/19 X |
| 5,291,708 | 3/1994 | Johnson | 47/33 X |
| 5,414,956 | 5/1995 | Kheradpir | 47/33 |
| 5,826,372 | 10/1998 | Parsons | 47/33 |
| 5,852,895 | 12/1998 | Sinanan | 47/33 |
| 5,870,873 | 2/1999 | Dahlin et al. | 52/102 X |
| 5,901,526 | 5/1999 | Vidmar et al. | 52/102 X |

*Primary Examiner*—Lynne H. Browne
*Assistant Examiner*—John R. Cottingham
*Attorney, Agent, or Firm*—St. Onge Steward Johnston & Reens LLC

[57] ABSTRACT

An edging system for use in landscaping is provided. The edging system consists of a number of modular elements, each of which has a hollow body with two side walls, a base, a first end wall, and a second end wall. The base of the body is substantially planar for resting on a landscape. An integral male connector is attached to the first end wall of the body. The integral male connector includes an anchor portion extending below the base of the body to facilitate insertion and anchoring in the landscape. An integral female connector is attached to the second end wall of the body. The integral female connector is adapted to receive the integral male connector of another contiguous modular element.

19 Claims, 3 Drawing Sheets

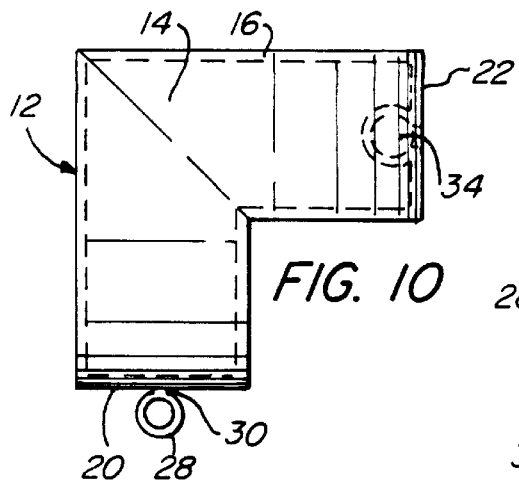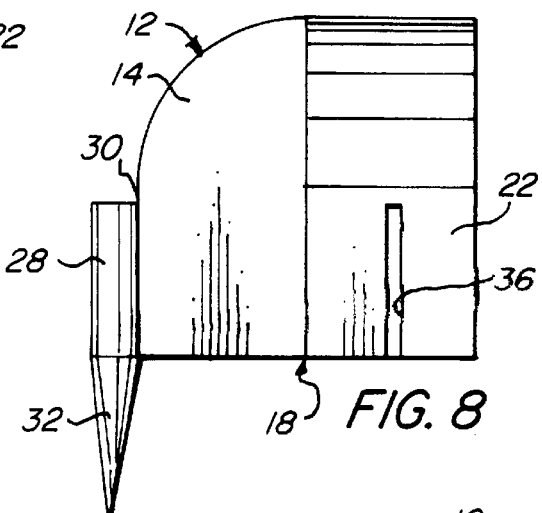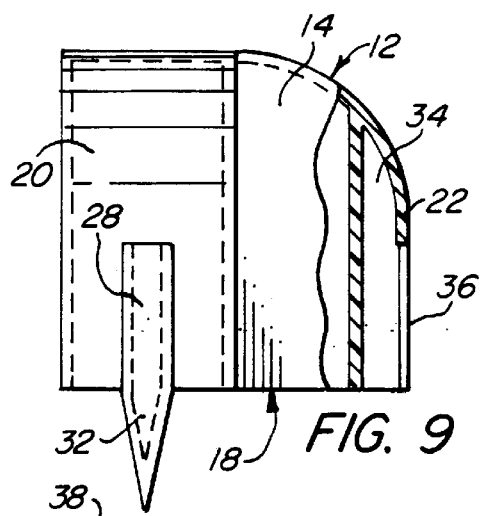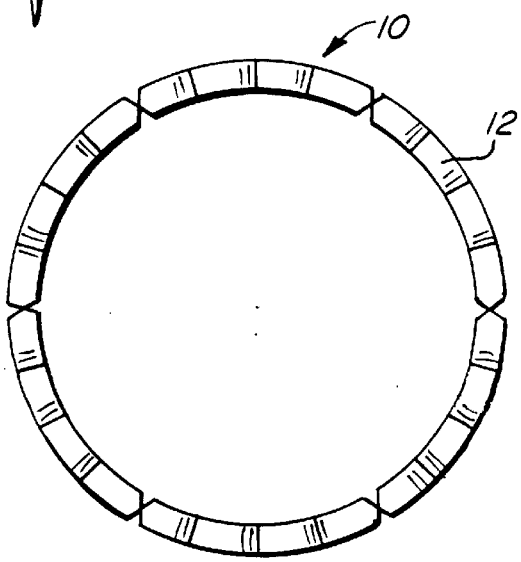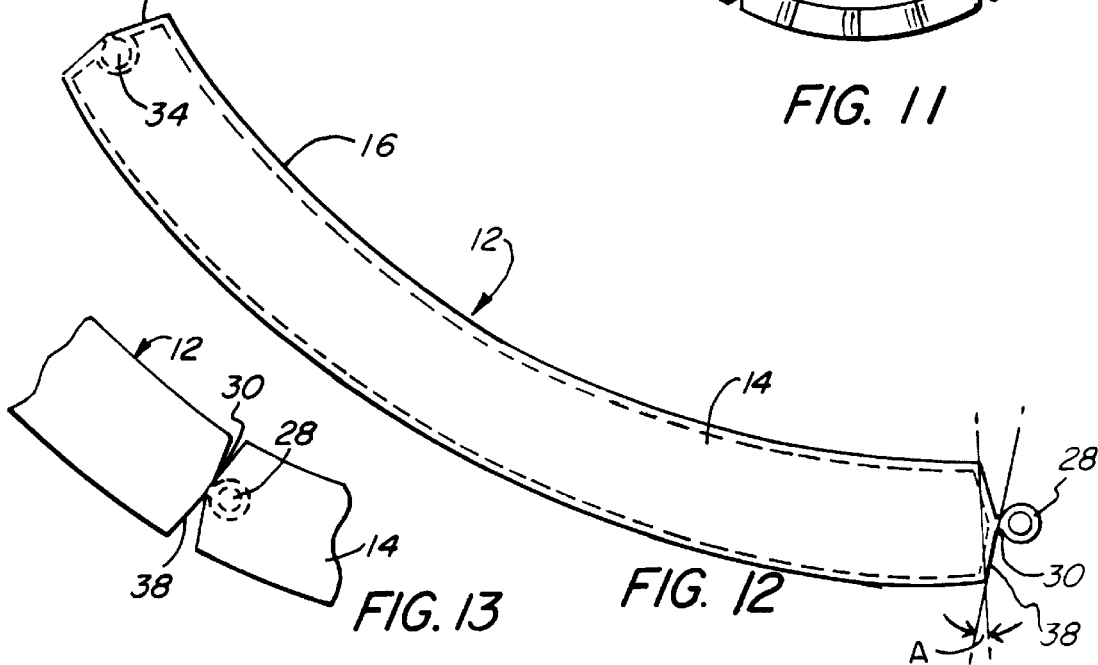

EDGING BLOCK SYSTEM

FIELD OF THE INVENTION

The present invention relates to borders formed from a series of modular elements, and more particularly to modular elements which interlock to form border edging around various landscaping features, such as gardens, flowerbeds, walkways, driveways, and the like, and a method for assembling the same.

BACKGROUND OF THE INVENTION

Borders formed from a series of modular elements are well known. Such borders have long been used for a myriad of applications as an effective and efficient means of providing an edging around landscaping features, as well as numerous other objects. However, although the prior art is somewhat developed, certain deficiencies in this general area exist.

One deficiency which is apparent in many prior art designs is the lack of an effective and efficient anchoring means. Once the assembled edging is located in the desired position, the edging must not be easily and undesirably moveable. As such, an anchoring system is essential. Many known edging designs, however, lack any anchoring system whatsoever. Moreover, the anchoring system must properly insert into the landscaping easily and must sufficiently hold the edging in place. The anchoring means of prior art edging systems do not accomplish this.

Another deficiency of prior art edging designs relates to the means of joining the modular elements together. The linking means must be sufficiently simple to allow a person working alone to easily construct the edging system and locate it in the desired position. Moreover, once the elements are joined, they must not easily disassemble unintentionally. The linking means of many prior art systems is not acceptable in these regards.

A further deficiency of many prior art systems is that they do not allow for edging around curved features of a landscape. These systems can only be used with square or rectangular shapes. Since landscaping features are often circular or have other curvelinear shapes, such systems are not viable.

What is desired, therefore, is an edging system which includes an effective and efficient anchoring means, which is easy to assemble, which does not easily disassemble unintentionally, and which allows for edging around curved features of a landscape. It is also desirable to provide a method for assembling an edging system with the above characteristics from a series of modular elements.

SUMMARY OF THE INVENTION

Accordingly, it is an object of the present invention to provide an edging system which includes an effective and efficient anchoring means.

Another object of the present invention is to provide an edging system having the above characteristics and which is easy to assemble.

A further object of the present invention is to provide an edging system having the above characteristics and which does not easily disassemble unintentionally.

Still another object of the present invention is to provide an edging system having the above characteristics and which allows for edging around curved features of a landscape.

In another aspect, it is an object of the present invention to provide a method for assembling an edging system with the above characteristics from a series of modular elements.

These and other objects of the present invention are achieved by provision of an edging system, for use in landscaping, consisting of a number of modular elements. Each of the modular elements has a hollow body with two side walls, a base, a first end wall, and a second end wall. The base of the body is substantially planar for resting on a landscape. An integral male connector is attached to the first end wall of the body. The integral male connector includes an anchor portion extending below the base of the body to facilitate insertion and anchoring in the landscape. An integral female connector is attached to the second end wall of the body. The integral female connector is adapted to receive the integral male connector of another contiguous modular element.

Preferably the integral female connector is located internal of the second end wall and within the hollow body. Also preferably, the integral male connector is substantially cylindrical and the anchor portion of the integral male connector is substantially conical. In addition, the first end wall and the second end wall of the body are each preferably divided into two end wall sections which diverge from each other and form an angle relative to the side walls such that contiguous modular elements are capable of relative pivotal positioning. Further, the body of each modular element may be a straight piece, with the first end wall of the body parallel to the second end wall of the body, a corner piece, with the first end wall perpendicular to the second end wall, a curved piece, with the first end wall angled relative to the second end wall, or any of numerous other possible shapes.

The invention and its particular features and advantages will become more apparent from the following detailed description considered with reference to the accompanying drawings.

BRIEF DESCRIPTION OF THE DRAWINGS

FIG. 8 is an end view from the side with the female connector of a modular element corner piece of the edging system of FIG. 1;

FIG. 9 is an end elevational, and partially cross-sectional, view from the side with the male connector of a modular element corner piece of the edging system of FIG. 1;

FIG. 10 is a top elevational view of a modular element corner piece of the edging system of FIG. 1;

FIG. 11 is a top view of an edging system in accordance with another embodiment of the present invention;

FIG. 12 is a top elevational view of a modular element curved piece of the edging system of FIG. 11; and, FIG. 13 is a top partially elevational view of portions of modular element curved pieces of the edging system of FIG. 11.

DETAILED DESCRIPTION OF THE INVENTION

Figure 1:
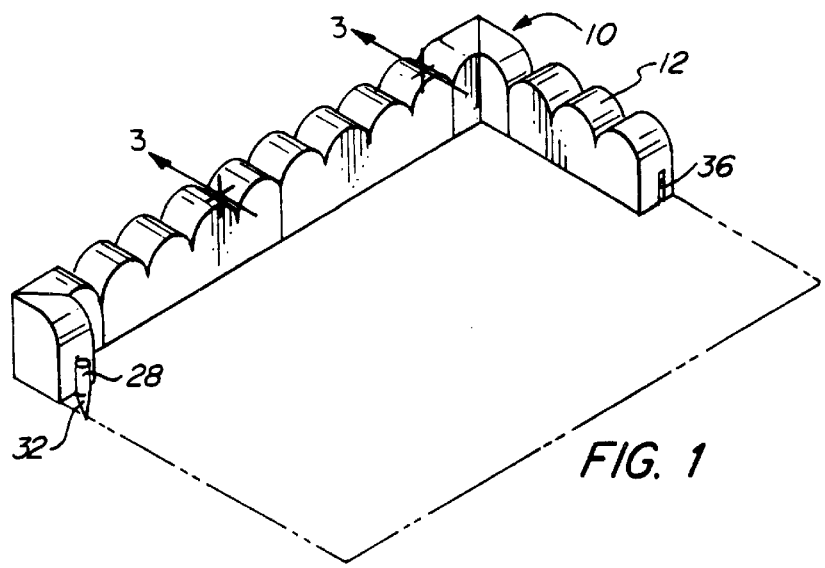
FIG. 1 is an isometric view of a portion of an edging system in accordance with the present invention.
Figure 2:
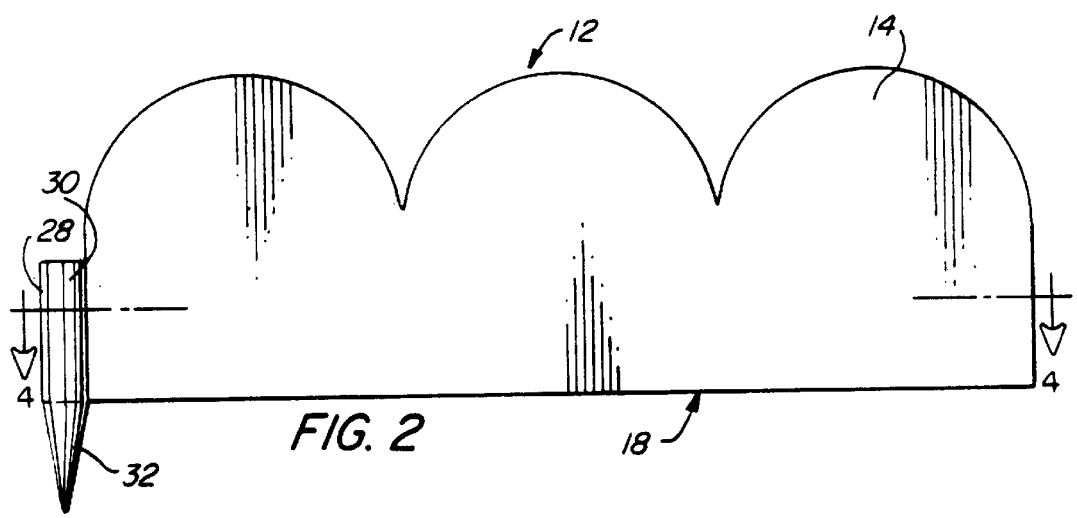
FIG. 2 is a side view of a modular element straight piece of the edging system of FIG. 1.
Figure 3:
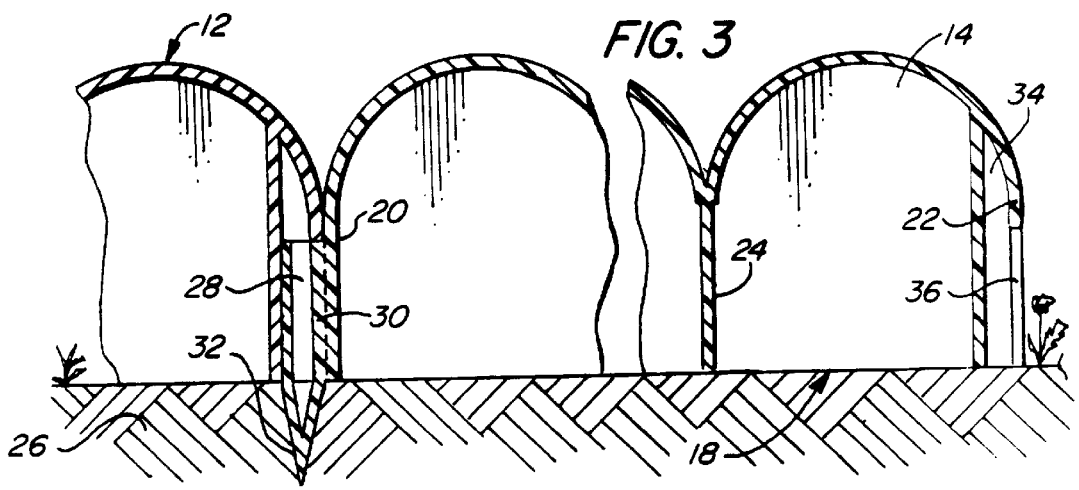
FIG. 3 is a partially cross-sectional view of portions of modular element straight pieces taken along line 3—3 of FIG. 1.
Figure 4:
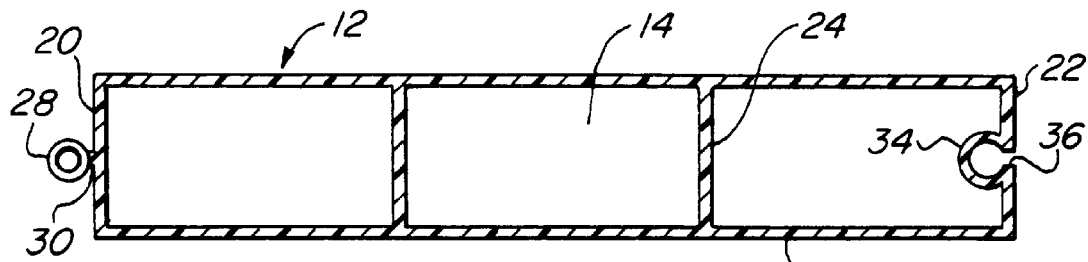
FIG. 4 is a partially cross-sectional view of a modular element straight piece taken along line 4—4 of FIG. 2.
Figure 5:
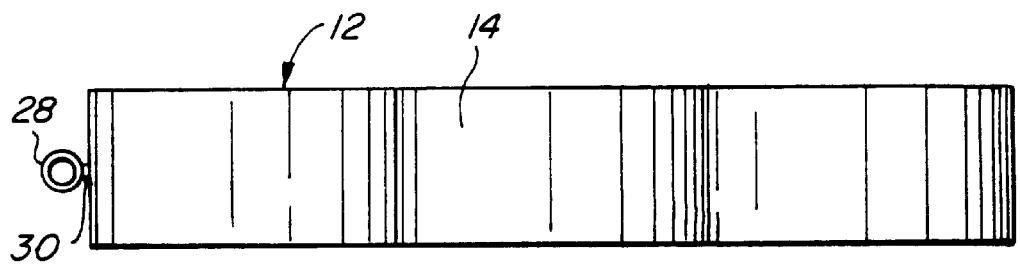
FIG. 5 is a top view of a modular element straight piece of the edging system of FIG. 1.
Figure 6:
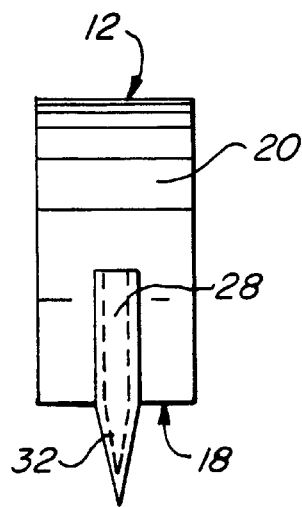
FIG. 6 is an end elevational view from the side with the male connector of a modular element straight piece of the edging system of FIG. 1.
Figure 7:
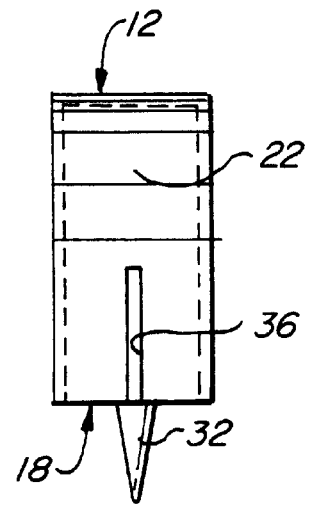
FIG. 7 is an end elevational view from the side with the female connector of a modular element straight piece of the edging system of FIG. 1.

Referring first to FIGS. 1 through 10, an edging system 10 in accordance with the present invention is shown. The edging system 10 includes a number of modular elements 12, each of which has a hollow body 14 with two side walls 16, a base 18, a first end wall 20, and a second end wall 22. Body 14 may also include a number of ribs 24, which act to strengthen body 14. Ribs 24 are especially desirable when body 14 has an elongated configuration. Base 18 of body 14 is substantially planar for resting on a landscape 26. The top portion of body 14 may have any of numerous configurations for making edging system 10 aesthetically pleasing.

An integral male connector 28 is attached to first end wall 20 of body 14 by way of a neck 30 extending from the outer surface of first end wall 20. Integral male connector 28 includes an anchor portion 32 extending below base 18 of body 14 to facilitate insertion and anchoring in landscape 26. Preferably, integral male connector is substantially cylindrical and anchor portion 32 is substantially conical. Other configurations are acceptable however. For example, integral male connector 28 may have a square or rectangular cross section and anchor portion 32 may be shaped like an inverted pyramid. Anchor portion 32 may also include ribs, serrations, or barbs for enhancing the anchoring of edging system 10 in landscape 26. Integral male connector 28 may be hollow (as shown in the FIGS.), but may be solid as well.

An integral female connector 34 is attached to second end wall 22 of body 14. Preferably, integral female connector 34 is located internal of second end wall 22 and within hollow body 14. When such is the case, second end wall 22 includes an elongated opening 36. Integral female connector 34 and elongated opening 36 are sized and shaped to receive integral male connector 28 and neck 30 respectively of another contiguous modular element 12.

Body 14, integral male connector 28 and integral female connector 34 are preferably integrally molded as one piece from a plastic, most preferably polyethylene. Body 14 of each modular element 12 may be a straight piece (shown in FIGS. 1–7), with first end wall 20 of body 14 parallel to second end wall 22 of body 14, a corner piece (shown in FIGS. 1 and 8–10), with first end wall 20 perpendicular to second end wall 22, a curved piece (shown in FIGS. 11–13), with first end wall 20 angled relative to second end wall 22, or any of numerous other possible shapes. Often, a combination of modular elements 12 having various shapes is necessary to accomplish the desired edging configuration.

Referring now to FIGS. 11–13, another embodiment of the present invention is shown. In this embodiment first end wall 20 and second end wall 22 of body 14 are each divided into two end wall sections 38 which diverge from each other and form an angle A, preferably about seven degrees, relative to side walls 16 such that contiguous modular elements 12 are capable of relative pivotal positioning (best seen in FIG. 13). Such relative pivotal positioning is desirable so that landscaping features having shapes which are not perfectly geometric can be edged, and is most desirable when body 14 of modular element 12 is a curved piece The present invention, therefore, provides an edging system which includes an effective and efficient anchoring means, which is easy to assemble, which does not easily disassemble unintentionally, and which allows for edging around curved features of a landscape.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An edging system for being secured to a landscape having an upper surface, said system comprising a plurality of modular elements, each of said plurality of modular elements comprising:

a hollow body having two side walls, a base, a first end wall, and a second end wall, the base of said body being substantially planar for resting on said landscape;

an integral male connector attached to the first end wall of said body, said integral male connector including an anchor portion extending below the base of said body to facilitate insertion and anchoring in said landscape;

an integral female connector attached to the second end wall of said body, said integral female connector adapted to receive said integral male connector of another of said plurality of modular elements; and wherein only the anchor portion of said integral male connector extends beneath the upper surface of said landscape, while the remainder of each of said modular elements is located above the upper surface of said landscape.

2. The edging system of claim 1 wherein said integral female connector is located internal of the second end wall and within said hollow body.

3. The edging system of claim 1 wherein said integral male connector is substantially cylindrical.

4. The edging system of claim 3 wherein the anchor portion of said integral male connector is substantially conical.

5. The edging system of claim 3 wherein the first end wall and the second end wall of said body are each divided into two end wall sections which diverge from each other and form an angle relative to said side walls such that contiguous modular elements are capable of relative pivotal positioning.

6. The edging system of claim 1 wherein said body of at least one of said plurality of modular elements comprises a straight piece, and wherein the first end wall of said body is parallel to the second end wall of said body.

7. The edging system of claim 1 wherein said body of at least one of said plurality of modular elements comprises a corner piece, and wherein the first end wall of said body is perpendicular to the second end wall of said body.

8. The edging system of claim 1 wherein said body of at least one of said plurality of modular elements comprises a curved piece, and wherein the first end wall of said body is angled relative to the second end wall of said body.

9. An edging system for being secured to a landscape having an upper surface, said system comprising a plurality of modular elements, each of said plurality of modular elements comprising:

a hollow body having two side walls, a base, a first end wall, and a second end wall, the base of said body being substantially planar for resting on said landscape;

a substantially cylindrical integral male connector attached to the first end wall of said body, said integral male connector including a substantially conical anchor portion extending below the base of said body to facilitate insertion and anchoring in the landscape;

an integral female connector attached to the second end wall of said body internal of the second end wall and within said hollow body, said integral female connector adapted to receive said integral male connector of another of said plurality of modular elements; and wherein only the anchor portion of said integral male connector extends beneath the upper surface of said landscape, while the remainder of each of said modular elements is located above the upper surface of said landscape.

10. The edging system of claim 9 wherein the first end wall and the second end wall of said body are each divided into two end wall sections which diverge from each other and form an angle relative to said side walls such that contiguous modular elements are capable of relative pivotal positioning.

11. The edging system of claim 9 wherein said body of at least one of said plurality of modular elements comprises a straight piece, and wherein the first end wall of said body is parallel to the second end wall of said body.

12. The edging system of claim 9 wherein said body of at least one of said plurality of modular elements comprises a corner piece, and wherein the first end wall of said body is perpendicular to the second end wall of said body.

13. The edging system of claim 9 wherein said body of at least one of said plurality of modular elements comprises a curved piece, and wherein the first end wall of said body is angled relative to the second end wall of said body.

14. An edging system for being secured to a landscape having an upper surface, said system comprising a plurality of modular elements, each of said plurality of modular elements comprising:

a hollow body having two side walls, a base, a first end wall, and a second end wall, the base of said body being substantially planar for resting on said landscape and the first end wall and the second end wall each being divided into two end wall sections which diverge from each other and form an angle relative to said side walls such that contiguous modular elements are capable of relative pivotal positioning;

a substantially cylindrical integral male connector attached to the first end wall of said body, said integral male connector including a substantially conical anchor portion extending below the base of said body to facilitate insertion and anchoring in the landscape;

an integral female connector attached to the second end wall of said body internal of the second end wall and within said hollow body, said integral female connector adapted to receive said integral male connector of another of said plurality of modular elements; and wherein only the anchor portion of said integral male connector extends beneath the upper surface of said landscape, while the remainder of each of said modular elements is located above the upper surface of said landscape.

15. The edging system of claim 14 wherein said body of at least one of said plurality of modular elements comprises a straight piece, and wherein the first end wall of said body is parallel to the second end wall of said body.

16. The edging system of claim 14 wherein said body of at least one of said plurality of modular elements comprises a corner piece, and wherein the first end wall of said body is perpendicular to the second end wall of said body.

17. The edging system of claim 14 wherein said body of at least one of said plurality of modular elements comprises a curved piece, and wherein the first end wall of said body is angled relative to the second end wall of said body.

18. In the method for assembling an edging system from a series of modular elements, each of the modular elements having a hollow body with two side walls, a base, a first end wall, and a second end wall, the base of the body being substantially planar for resting on a landscape having an upper surface, each modular element also having an integral male connector attached to the first end wall of the body, the integral male connector including an anchor portion extending below the base of the body to facilitate insertion and anchoring in the landscape, and an integral female connector attached to the second end wall of the body, the integral female connector adapted to receive the integral male connector of another modular element, wherein only the anchor portion of said integral male connector extends beneath the upper surface of said landscape, while the remainder of each of said modular elements is located above the upper surface of said landscape, said method for assembling comprising the steps of:

providing a first modular element;

inserting the anchor portion of the integral male connector of the first modular element into the landscape until the base of the first modular element rests on the landscape and the remainder of the first modular element is located above the upper surface of said landscape;

providing a next modular element;

fitting the integral female connector of the next modular element over the integral male connector of the previous modular element and inserting the anchor portion of the integral male connector of the next modular element into the landscape until the base of the next modular element rests on the landscape and the remainder of the first modular element is located above the upper surface of said landscape; and, repeating said providing a next modular element step and said fitting step until the desired edging system configuration is achieved.

19. The method for assembling an edging system from a series of modular elements of claim 18 further comprising, after the repeating step, the step of fitting the integral female connector of the first modular over the integral male connector of the last of the next modular elements to form an enclosed configuration.

* * * * *